United States Patent
Li et al.

(10) Patent No.: US 12,072,935 B2
(45) Date of Patent: Aug. 27, 2024

(54) MACHINE-LEARNING OF DOCUMENT PORTION LAYOUT

(71) Applicant: Microsoft Technology Licensing, LLC, Redmond, WA (US)

(72) Inventors: Yao Li, Issaquah, WA (US); Liang Du, Redmond, WA (US); Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/469,751

(22) Filed: Sep. 8, 2021

(65) Prior Publication Data
US 2023/0074788 A1    Mar. 9, 2023

(51) Int. Cl.
*G06F 17/00*    (2019.01)
*G06F 16/901*   (2019.01)
(Continued)

(52) U.S. Cl.
CPC ...... *G06F 16/901* (2019.01); *G06F 16/90344* (2019.01); *G06F 16/93* (2019.01);
(Continued)

(58) Field of Classification Search
CPC .. G06F 16/901; G06F 16/90344; G06F 16/93; G06F 16/951; G06F 16/31;
(Continued)

(56) References Cited

U.S. PATENT DOCUMENTS

| 8,549,008 B1 | 10/2013 | Wang et al. |
| 2001/0056418 A1 | 12/2001 | Youn |

(Continued)

FOREIGN PATENT DOCUMENTS

| CN | 102999556 B | 2/2016 |
| EP | 3037992 A1 | 6/2016 |
| JP | 2007279978 A | 10/2007 |

OTHER PUBLICATIONS

Esposito, et al., "Machine Learning for Digital Document Processing: from Layout Analysis to Metadata Extraction", In Book of Machine learning in document analysis and recognition, Dec. 1, 2007, 35 Pages.

(Continued)

*Primary Examiner* — Greta L Robinson
(74) *Attorney, Agent, or Firm* — Workman Nydegger

(57) ABSTRACT

Machine learning to predict a layout type that each of a plurality of portions of a document appears in. This is done even though the computer-readable representation of the document does not contain information at the granularity of the prediction to be made that identifies which layout type that each of the plurality of document portions belongs in. For each of a plurality of the portions, the machine-learning system predicts the layout type that the respective portion appears in, and indexes the document using the predictions so as to result in a computer-readable index. The index represents a predicted layout type associated with each of the plurality of portions of the document. Thus, the index can be used to search based on position of a searched term within the document.

19 Claims, 13 Drawing Sheets

(51) Int. Cl.
  *G06N 5/025* (2023.01)
  *G06N 20/00* (2019.01)
  *G06V 30/414* (2022.01)
(52) U.S. Cl.
  CPC .............. *G06N 3/02* (2013.01); *G06N 5/025* (2013.01); *G06N 20/00* (2019.01); *G06V 30/414* (2022.01)
(58) Field of Classification Search
  CPC .......... G06N 3/02; G06N 5/025; G06N 20/00; G06V 30/414
  See application file for complete search history.

(56) References Cited

U.S. PATENT DOCUMENTS

| | | | | |
|---|---|---|---|---|
| 2002/0054251 A1* | 5/2002 | Maruyama | ............ | G02F 1/1334 349/88 |
| 2003/0225747 A1* | 12/2003 | Brown | .................... | G06F 16/93 |
| 2009/0157620 A1 | 6/2009 | Kim et al. | | |
| 2016/0092406 A1* | 3/2016 | Farouki | ................. | G06F 18/285 715/249 |
| 2016/0179768 A1* | 6/2016 | Piesche | ................. | G06F 16/907 715/255 |
| 2016/0292296 A1 | 10/2016 | Murphy et al. | | |
| 2021/0042518 A1 | 2/2021 | Khandekar | | |
| 2021/0081613 A1 | 3/2021 | Begun et al. | | |

OTHER PUBLICATIONS

"International Search Report and Written Opinion Issued in PCT Application No. PCT/US22/038607", Mailed Date: Nov. 21, 2022, 12 Pages. (MS# 410414-WO-PCT).

Ramakrishnan, et al., "Layout-Aware Text Extraction from Full-Text PDF of Scientific Articles", In Journal of Source code for biology and medicine, vol. 7, Issue 2, Dec. 7, 2012, 10 Pages.

* cited by examiner

HLA antibodies in both the product and patient serum. TRALI may be managed using oxygen thereapy with adequate ventilatory support. } 601

5.8 Volume Overload } 602

The high dose regimen (1 g/kg) x 1-2 days is not recommended for individuals with expander fluid volumes or where fluid volume may be a concern. } 603

5.9 Transmission of Infectious Agents } 604

Because GAMUNEX-C is made from human blood it may carry a risk of trasmitting infectious agents, e.g., viruses, the variant Creutzfeldt-Jakoh disease (vCJD) agent and theoretically the Creutzfeldt-Jakob disease (CJD) agent. No cases of transmission of viral diseases vCJD or CJD have ever been identified for GAMUNEX-C. All infections suspected by a physician possibly to have been trasmitted by this product should be reported by the physician or other healthcare provider to Grifols Therapeutics, Inc. [1-800-520-2807] } 605

5.10 Hematoma Formation } 606

Do not administer GAMUNEX-C subcutaneously in patients with ITP because of the risk of hematoma formation. } 607

5.11 Monitoring: Laboratory Tests } 608

- Periodic monitoring of renal function and urine output is particularly important in patients judged to be at increased risk of developing acute renal failure. Assess renal function including measurement of BUN and serum creatinine before the initial infusion of GAMUNEX-C and at appropriate intervals thereafter.
- Consider baseline assessment of blood viscosity in patients at risk for hyperviscosity, including those with cryoglobulins fasting chylomicronemia/markedly high triacylyglycerols (triglycerides) or monoclonal gammopathies, because of the potentially increased risk of thrombosis.
- If signs and/or symptoms of hemolysis are present after an infusion of GAMUNEX-C perform appropriate laboratory testing for confirmation.
- If TRALI is suspected, perform appropriate tests for the presence of anti-neutrophil antibodies and anti-HLA antibodies in both the product and patient's serum.
} 609

5.12 Interference with Laboratory Tests } 610

After infusion of IgG, the transitory rise of the various passively transferred antibodies in the patient's blood may yield positive serological testing results, with the potential for misleading interpretation. Passive transmission of antibodies to erythrocyte antigens (e.g., A B and D may cause a positive direct or indirect antiglobulin (Coombs) test. } 611

| layoutlist "vaccine"

Search Results (95)

☐ fda100783.pdf    🔍 4/19 Search Results  < >

📄 fda115261.pdf
16 Results

📄 fda100783.pdf
19 Results

📄 fda84495.pdf
23 Results

📄 fda107499.pdf
13 Results

📄 fda109113.pdf
10 Results

📄 fda75988.pdf
11 Results

📄 fda76517.pdf
11 Results

📄 fda81559.pdf
12 Results

📄 fda75709.pdf
12 Results

📄 fda76008.pdf
8 Results

*addition* to the 3-dose regimen. CBER agreed.

2.6 Other Relevant Background Information

- Epidemiological studies indicate that HPV acquisition occurs soon after sexual debut, which tends to occur at 15 years of age and above in most countries. HPV vaccines are intended for prophylaxis, and therefore, initiation and completion of the vaccination regimen before coitarche would be ideal.
- Data on vaccination uptake among adolescents (13 to 17 years old) has been collected by the CDC since 2006. The latest data from 2013 indicate that uptake has been increasing, but remains lower than expected. Initiation rates for an HPV vaccine were estimated at 57.3% for girls and 34.6% for boys. Completion on the 3-dose series lower, with 40% for girls and 15% for boys.[2]
- Interest in a 2-dose regimen for HPV vaccines stems from clinical data and public health-oriented benefits.
  o Immunobridging studies of the 3-dose regimen in pre-adolescents have demonstrated enhanced antibody responses compared to young women between the ages of 16 and 26 years old, in whom vaccine efficacy was established in prelicensure studies of a 3-dose series of HPV vaccine.
    ▪ This suggested the possibility that a dose could be eliminated while maintaining immunogenicity. Subsequently, a published Page 6

MACHINE-LEARNING OF DOCUMENT PORTION LAYOUT

BACKGROUND

Computing technology can be used to search for keywords or phrases that exist in a collection of documents. As an example, web search engines allow for searching of the Internet, which is a large collection of web sites. As another example, operating systems have search functionality enabling the searching of documents within directory folders based on keywords. Some search engines allow for the searching of HyperText Markup Language (HTML) documents by using a combination of a keyword or phrase and a markup tag. The markup tag can sometimes identify layout of the associated element. Of course, there exists a wide assortment of documents that have no such tags or other identification of the layout types in which constituent elements of the document are located.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the use of machine learning to predict a layout type that each of a plurality of portions of a document appears in. This is done even though the computer-readable representation of the document does not contain information at the granularity of the prediction to be made that identifies which layout type that each of the plurality of document portions belongs in. For each of a plurality of the portions, the machine-learning system predicts the layout type that the respective portion appears in, and indexes the document using the prediction so as to result in a computer-readable index. The index represents a predicted layout type associated with each of the plurality of portions of the document. Thus, the index can be used to search based on position of a searched term within the document.

In one embodiment, the index for each document is represented in the form of layout-specific collections of index entries. For example, there might be a collection of index entries for tables, another for lists, another for footnotes, and so forth. This allows searching of documents based on layout to be more efficient as only the relevant collection of index entries are searched for the search terms of interest.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 2 illustrates a flow in which a model makes a prediction about a layout type that portions of a document appear in;

FIG. 4 illustrates a flowchart of a method for predicting a layout type that portions of documents appear in;

FIG. 6 illustrates a page of that includes twelve (12) layout segments of text having a particular layout;

FIG. 8 illustrates a user interface in which the user entered a query layout:table "vaccine" in the search query field indicating that the user is searching for any documents in which the term "vaccine" appears in a table-type layout;

FIG. 9 illustrates a similar user interface except in this case the user has searched for the same term located in a text layout;

FIG. 10 illustrates the case where the user has searched for documents having the term in a title;

FIG. 11 illustrates the case where the user has searched for documents having the term in a list;

FIG. 12 illustrates the case where the user has searched for documents having the term in a table-of-contents.

DETAILED DESCRIPTION

The principles described herein relate to the use of machine learning to predict a layout type that each of a plurality of portions of a document appears in. This is done even though the computer-readable representation of the document (at least at the granularity of the prediction to be made) does not contain information that identifies which layout type that each of the plurality of document portions belongs in. For each of a plurality of the portions, the machine-learning system predicts the layout type that the respective portion appears in, and indexes the document using the prediction so as to result in a computer-readable index. The index represents a predicted layout type associated with each of the plurality of portions of the document. Thus, the index can be used to search based on position of a searched term within the document.

In one embodiment, the index for each document is represented in the form of layout-specific collections of index entries. For example, there might be a collection of index entries for tables, another for lists, another for footnotes, and so forth. This allows searching of documents based on layout to be more efficient as only the relevant collection of index entries are searched for the search terms of interest.

Figure 1:
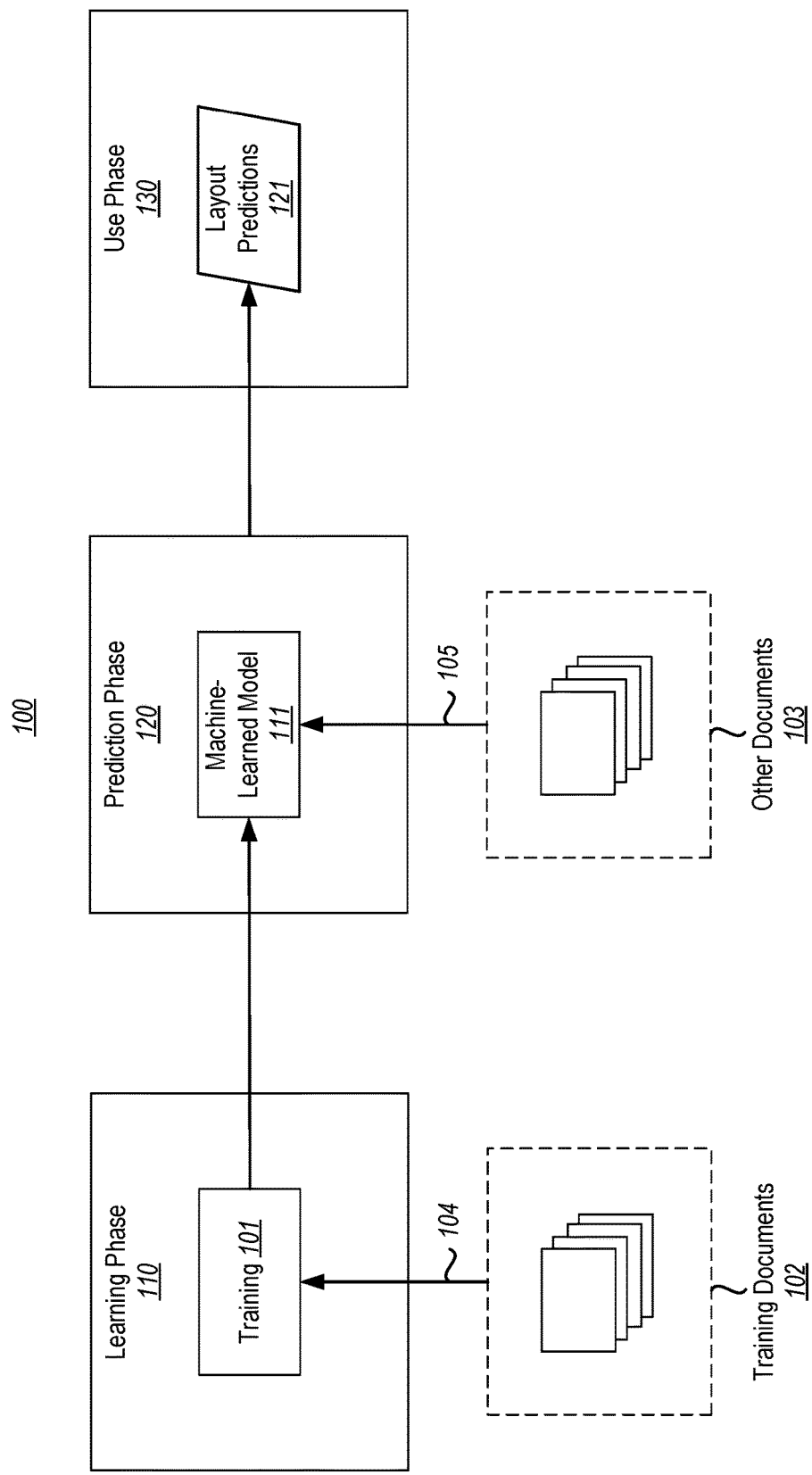
FIG. 1 illustrates three phases involved the machine learning described herein; namely, a learning phase, a prediction phase, and a use phase.

FIG. 1 illustrates three phases involved the machine learning described herein; namely, a learning phase 110, a prediction phase 120, and a use phase 130. In the learning phase 110, a model is trained (as represented by arrow 104) by training component 101 on a training document collection 102 to generate (as represented by arrow 112) a machine-learned model 111. As an example, the machine-learned model could at least partially be a neural network in which the biases and weights are adjusted and fine-tuned during the learning phase 110. The machine-learned model 111 is taught to make predictions about what layout type portions of documents appears in.

In the prediction phase 120, the machine-learned model is actually applied (as represented by arrow 105) to other documents 103 to make predictions 121 about what layout type each portion appears within. Those predictions 121 are then provided (as represented by arrow 122) in a form that can be later used. As an example, the predictions 121 may be represented in the form of an index of the other documents 103.

Finally, in the use phase 130, the predictions are put to use. For instance, the predictions could be used to perform searches for keywords based on layout type although other examples of use are also described herein. Examples of each of these phases will now be described beginning at the learning phase 110, proceeding next to the prediction phase 120, and concluding with the use phase 130.

Figure 2:
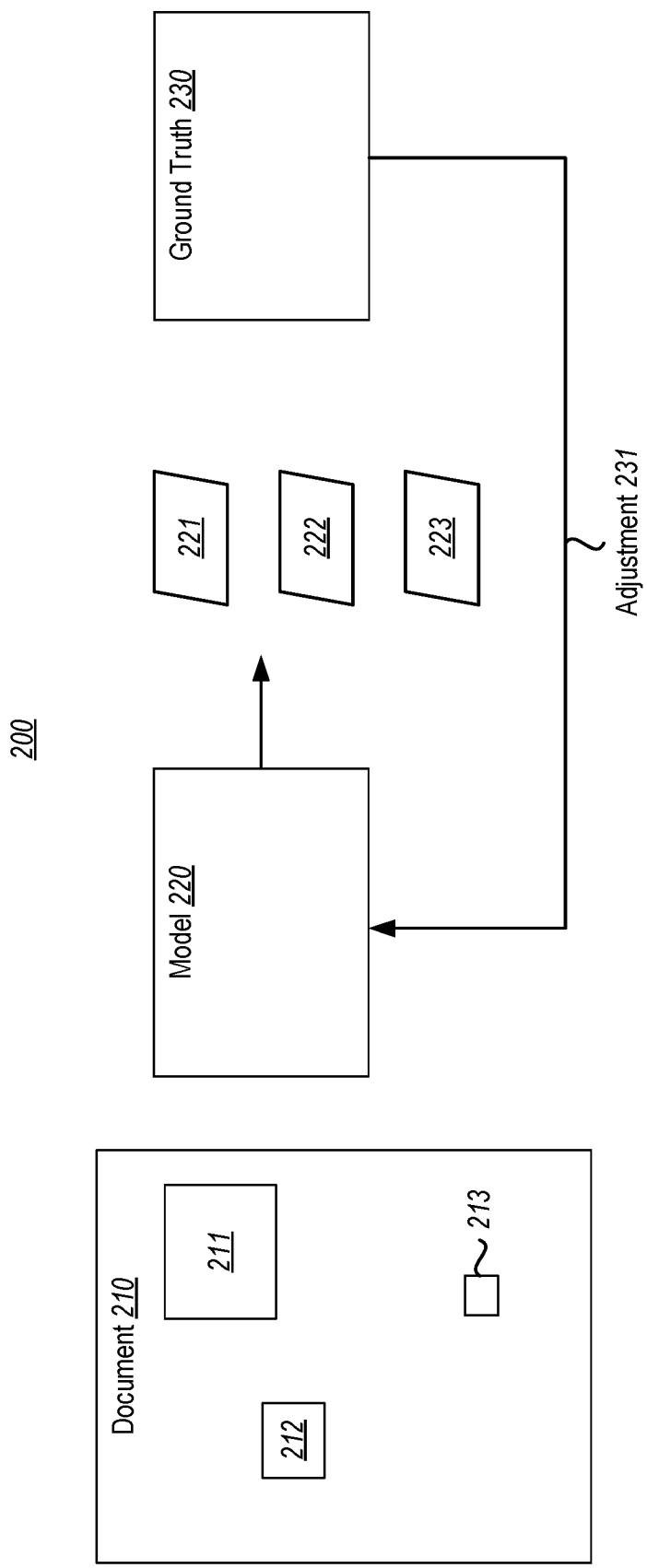

FIG. 2 illustrates a flow 200 in which a model 220 makes a prediction about a layout type that portions of a document 210 appear in. as an example, if the flow 200 is occurring in the learning phase 110 of FIG. 1, the document 210 may be one of the training documents 102 of FIG. 1. The model 220 could be, for example, a neural network where the biases and weights are adjusted during the training process to thereby improve the predictions.

Examples of layout types may include captions, titles, lists, text, footnotes, tables, images, and so forth. However, there may be many different layout types and the layout types may differ according to the nature of the documents. The layout types may be defined in supervised learning by human beings that decide what layout types are important to predict. The human beings may decide what layout types are important by determining how layout predictions will ultimately be used in the use phase 130.

The document 210 is illustrated as including portions 211, 212 and 213. A parser may first evaluate the document 210 to identify the space that each portion 211-213 takes within the document as well as the semantic features of the portion. The model 220 makes predictions 221, 222 and 223 (respectively) for each of the portions based on 1) the space that the portion takes within the document (e.g., the size and location of a bounding box of the portion) and 2) the semantic meaning of the respective portion. As an example, if the flow 200 is occurring in the learning phase 110 of FIG. 1.

There is no layout information at the granularity of the layout prediction to be made identified within the computer-readable representation of the document itself. As an example, some types of documents such as HyperText Markup Language (HTML) documents have layout information tagged within the document. However, other types of documents do not, such as PDF documents. But even for HTML documents where some layout information may be provided, the principles described herein may still be used to make predictions about layout beyond that identified within the document. The parser looks at the rendering of the document to identify different portions of the document for which layout prediction is to be made.

During the learning phase 110, each of the predictions 221, 222 and 223 would be compared against the ground truth 230. The ground truth 230 may be defined also by human beings in supervised learning, in which the human provides the correct answer for what areas of the training documents 102 are of the various layout types. The model 220 is adjusted (as represented by arrow 231) based on the error in each of the predictions. While there are only three portions 211 through 213 illustrated within the document 210, and only four documents illustrated within the training documents 102, there may be innumerable documents within the training documents 102, and many portions within each document. Thus, during training, the model 220 is adjusted many times so that the model 220 is gradually trained to make more and more accurate predictions about the layout type in which the portions appear.

In one example, the document portions 211, 212 and 213 are words within the document. However, the principles described herein are also applicable to make predictions about other portions, such as a character, especially where those characters alone express meaning. For instance, such characters could be Chinese characters, which implicitly include semantic meaning, unlike letters in the English alphabet. Since the portions have semantic meaning, sequential prediction may be used to make more accurate predictions about the layout type in which that portion appears taking into consideration the placement of the portion within its sequence of portions.

Because this application is authored in English, an example in which the portions are words are described herein. However, the principles are not limited to this. Also, in this example the words are sometimes described as being "portions" of the document. However, predictions about words of a sentence may also be used to predict what layout type an entire sentence appears within. In that case, the sentence is an example of a "portion", and the words will be in that case termed "sub-portions". However, in the case of words and sentences, the layout type in which the words appear may be predicted by a neural network, whereas the layout type in which a sentence appears may be predicted by applying simple rules to the word predictions. As an example, the prediction of the layout type in which a sentence appears may simply be whichever layout type is dominant amongst the predictions for the constituent words of that sentence. Thus, the learning phase 110 is primarily focused on making accurate predictions about the layout type in which a word appears.

As mentioned, the prediction of what layout type a word appears in can be based on the actual semantic meaning of the word, as well as the size and position of the word within the document. The size and position of the word can be represented by a simple bounding box. For an example only, words that have a large bounding box closer to the top of the document might more likely be predicted to be part of a title, especially if the words are more commonly those that appear in a title such as "study", "symposium", or the like. Words that have a smaller bounding box close to the bottom of the document might more likely be predicted to be part of a footer, especially if the words are more commonly those that appear in a footer, such as "note", "however", "disclaimer", "confidential", "page", or the like. In addition, the prediction of the layout type of the word may use sequence prediction in which the prediction of the layout type of a word can be influenced by the layout prediction for surrounding words and semantic relationships with surrounding words.

Thus, the learning phase 110 results in a machine-learned model 111 that can be used to make predictions of layout types associated with other documents 103 that were not in the training documents 102. The machine-learned model 111 could include a neural network that was actually trained in the learning phase 110 (to make predictions about words) in conjunction with a rules-based model that applies fixed rules (e.g., majority wins) to the word-level predictions. There is of course no need for the fixed rules-based model to have been trained.

Figure 3:
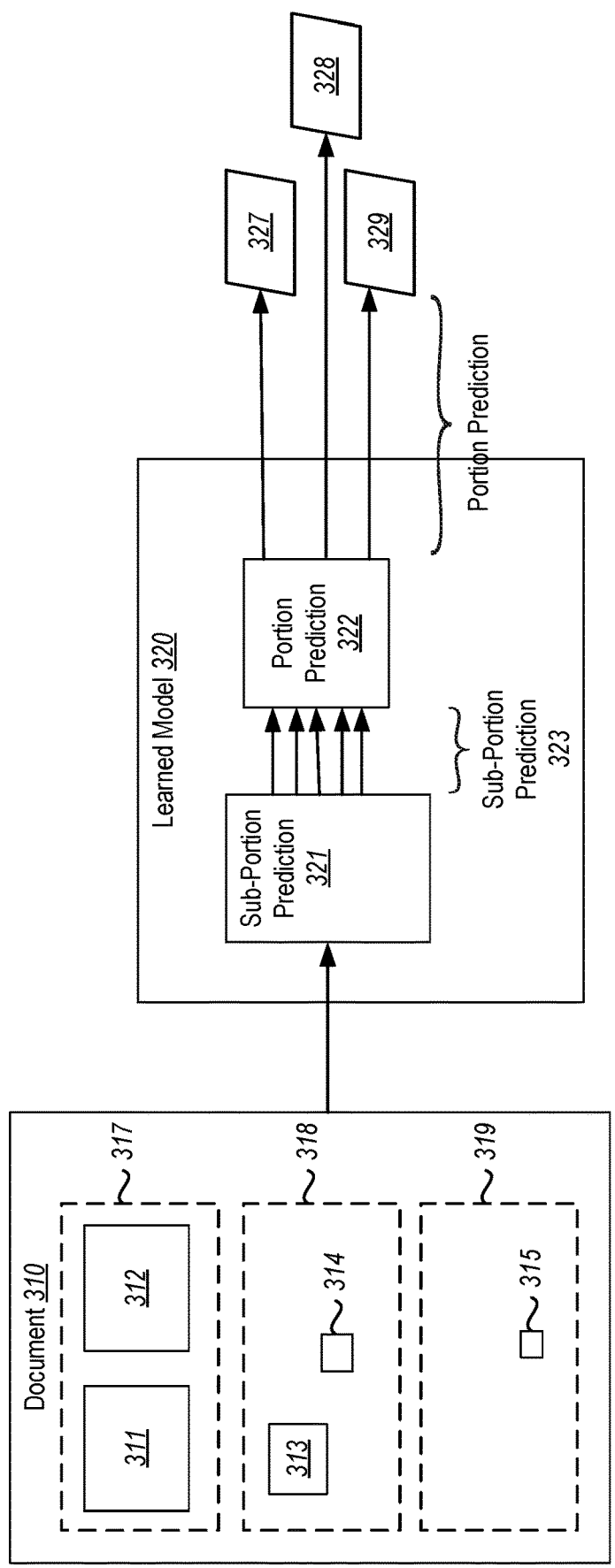
FIG. 3 illustrates an example environment and flow associated with making such a layout prediction.
Figure 4:
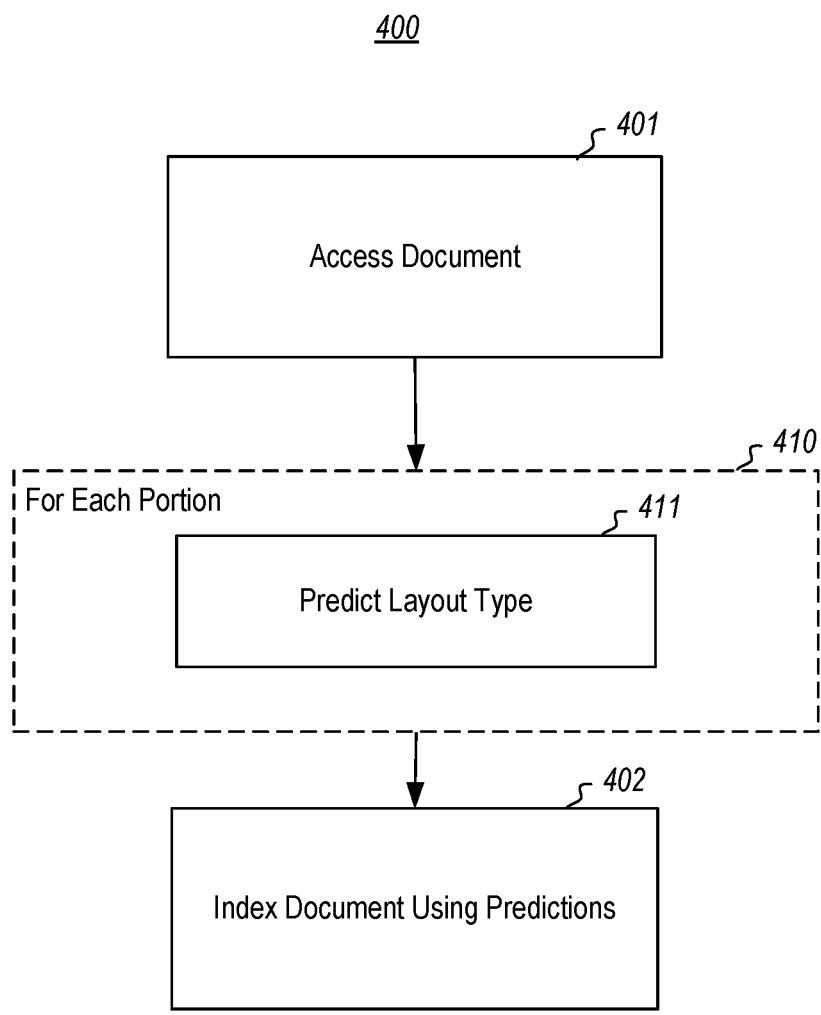

Referring to FIG. 1, after the learning phase 110 is the prediction phase 120. In the prediction phase 120, the machine-learned model 111 is used to make predictions of the layout type in which various portions of other documents 103 appear. FIG. 3 illustrates an example environment 300 and associated flow for making such a prediction. FIG. 4 illustrates a flowchart of a method 400 for predicting a layout type that portions of documents appear in. The method 400 of FIG. 4 may be performed in the environment 300 of FIG. 3. Accordingly, FIGS. 3 and 4 will be described with frequent reference to each other. The environment 300 may perform the method 400 once for each of potentially many documents for which layout prediction is to be performed.

In the method 400 that occurs in the prediction phase, the machine-learned model accesses a computer-readable representation of a document (act 401). As an example, in FIG. 3, the machine-learned model 320 accesses (as represented by arrow 316) the computer-readable representation of the document 310. The document 310 contains portions 317 through 319 thought there is no layout information for those portions identified within the document 310. More regarding the other sub-portions 311 through 315 will be described with respect to FIG. 5.

But for now referring to FIG. 4, the content of box 410 is then performed for each of the portions of the document. Specifically, the layout type in which the respective portion appears is predicted (act 411). Referring to FIG. 3, a prediction 327 of the layout type in which the portion 317 appears is output by the learned model 320. Similarly, the learned model 320 formulates predictions 328 and 329 of the layout type(s) in which the respective portions 318 and 319 appear. The document 310 is then indexed using the predictions (act 412).

Figure 5:
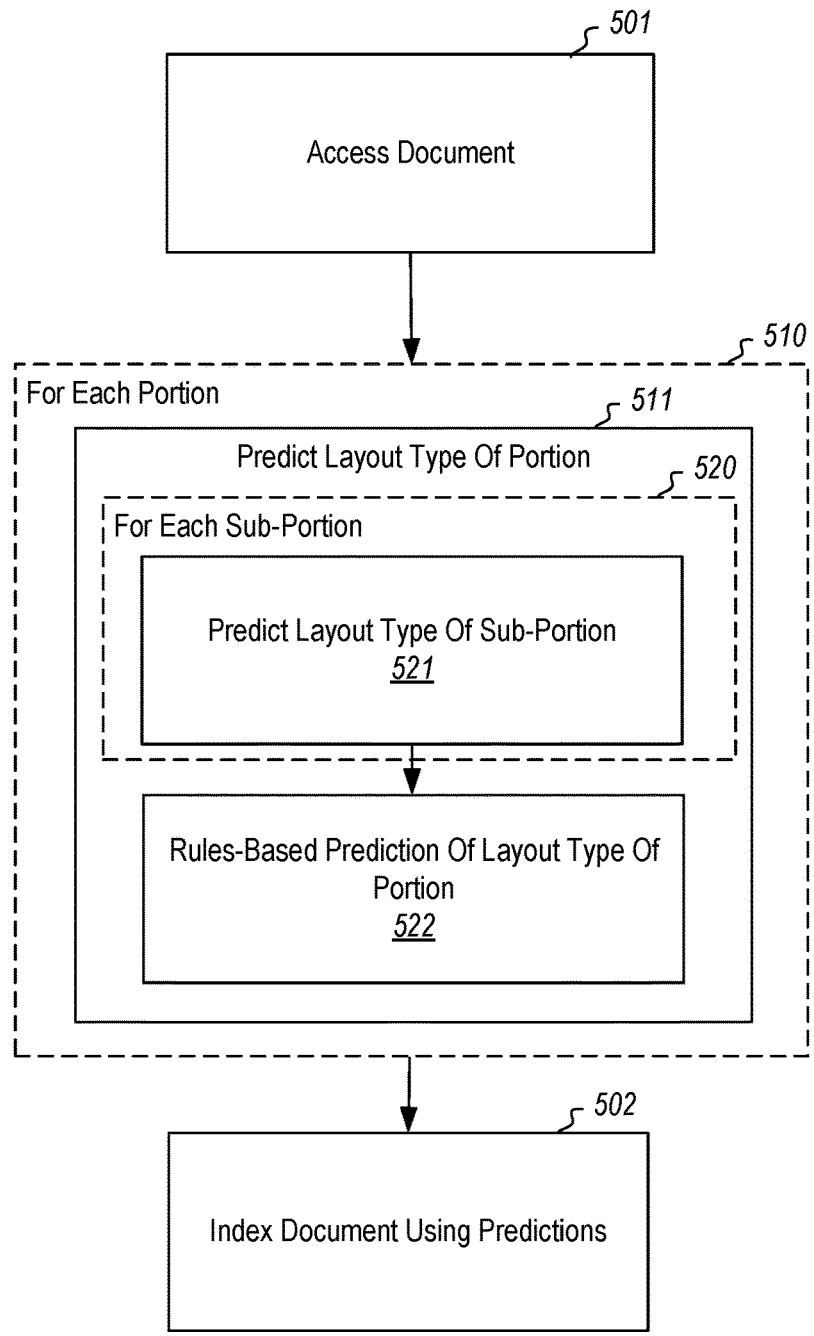
FIG. 5 illustrates a flowchart of a more specific method for predicting a layout type that portions of documents appear in, and represents a specific example of the method of FIG. 5.

FIG. 5 illustrates a flowchart of a more specific method 500 for predicting a layout type that portions of documents appear in. The more specific method 500 is a specific example of the method 400 of FIG. 4. In the more specific method 500, the predictions of the layout type in which a portion appears is based on prediction(s) of the layout type(s) in which one or more sub-portions appear. As an example, the portions could be sentences, and the sub-portions could be words or meaningful characters within the sentence. In the illustrated example of FIG. 3, the portion 317 of the document 100 includes sub-portions 311 and 312, the portion 318 includes sub-portions 313 and 314, and the portion 319 includes sub-portion 315.

In the method 500 that occurs in the prediction phase, the machine-learned model accesses a computer-readable representation of a document (act 501). As an example, in FIG. 3, the machine-learned model 320 accesses (as represented by arrow 316) the computer-readable representation of the document 310. The content of box 510 is then performed for each of the portions of the document. Specifically, the layout type in which the respective portion appears is predicted (act 511). Referring to FIG. 3, a prediction 327 of the layout type in which the portion 317 appears is performed by the learned model 320. Similarly, the learned model 320 formulates predictions 328 and 329 of the layout type(s) in which the respective portions 318 and 319 appear. The document is then indexed using the predictions (act 502).

However, the prediction of the layout type in which each portion appears (act 511) is performed by using a prediction of the layout type in which the constituent sub-portions appear. That is, to make a layout type prediction for a portion (e.g., a sentence), for each sub-portion of that sentence (box 520), a layout type prediction for that sub-portion (e.g., words) is made (act 521). Then, a rules-based model is used (act 522) to predict the layout type in which the portion appears using the layout type predictions in which each of the sub-portions appear.

As an example, if the majority of the words in a sentence are predicted to be within a footnote, the sentence itself is predicted to be in a footnote. If the majority of the words in a sentence are predicted to be in a table, the sentence itself is predicted to be in a table.

Referring to FIG. 3, for example, the sub-portion prediction component 321 receives (as represented by arrow 316) information (such as regarding the sub-portions 311 and 312) of the portion 317 of the document. Position, size, and semantic features of the sub-portion 311 are used by the sub-portion prediction component 321 to generate (as represented by arrows 323) a prediction of the layout type in which the sub-portion 311 appears. Likewise, features of the sub-portion 312 are used by the sub-portion prediction component 321 to generate (as again represented by arrows 323) a prediction of the layout type in which the sub-portion 312 appears. The portion prediction component 322 then uses rules (e.g., majority wins) applied to the sub-portion prediction in order to make a prediction 327 of the layout type in which the portion 317 appears.

The sub-portion prediction component 321 also predicts what layout type the sub-portions 313 and 314 appear in; and the portion prediction component 322 uses those sub-portion predictions to make a prediction 328 of which layout type the portion 318 appears within. The sub-portion prediction component 321 also predicts what layout type the sub-portion 315 appears in; and the portion prediction component 322 uses that sub-portion prediction 329 to make a prediction of which layout type the portion 319 appears within.

FIG. 6 illustrates a page of a document. That page includes twelve (12) layout segments 601-612 having a particular layout. Segments 601, 603, 605, 607 and 611 are of a text layout type being simple paragraphs of text. Each word in the text segments 601, 603, 605, 607 and 611 are bounded by a thin solid-lined box symbolizing that the sub-portion prediction component predicted each of the constituent words to be within a text layout type. This results in a sentence-level prediction being also of the text layout type for each sentence within a text segments. Note, however, that there may be some words within a text layout type segments that did not receive the text layout type prediction. However, if in that case, if the majority of the words in a given sentence did receive the text layout type prediction, then the existence of such anomalous word-level predictions will not change the sentence-level prediction.

Sections 602, 604, 606, 608 and 610 are of a title layout type. Each word in the title segments 602, 604, 606, 608 and 610 are bounded by a thick solid-lined box symbolizing that the sub-portion prediction component predicted each of the constituent words to be within a title layout type. This results in a sentence-level prediction being also of the title layout type for each sentence within a title segments.

Segment 609 is of a list layout type. Each word in the list segment 609 is bounded by a dashed-lined box symbolizing that the sub-portion prediction component predicted each of the constituent words to be of a list layout type. This results in a sentence-level prediction being also of the list layout type for each sentence within the list segment.

Finally, segment 612 is of a footnote layout type. Each word in the footnote segment 612 is bounded by a dotted-lined box symbolizing that the sub-portion prediction component predicted each of the constituent words to be of the footnote layout type. This results in a sentence-level prediction being also of the footnote layout type for each sentence within the footnote segment.

Figure 7:
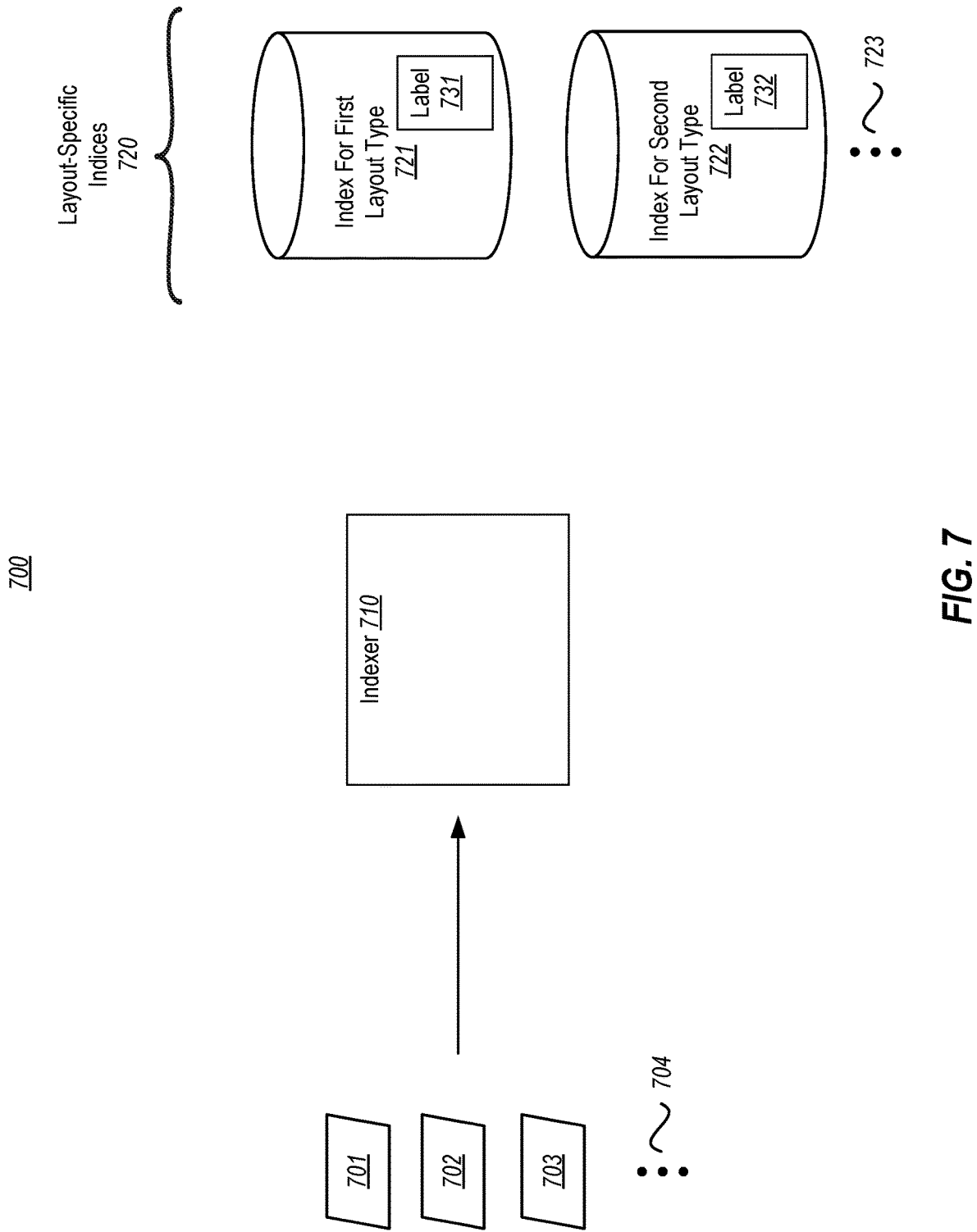
FIG. 7 illustrates and environment in which the indexing of the document occurs.

Referring back to FIGS. 4 and 5, the document is indexed (acts 402 and 502) using the predictions for each portion (e.g., using the predictions for each sentence). FIG. 7 illustrates and environment 700 in which the indexing of the document occurs. The portion predictions (e.g., the sentence predictions) are provided to an indexer component 710. As an example, there are three portion predictions 701 through 703 illustrated as being provided to the indexer component 710. However, the ellipsis 704 represents that there may be any number of portion predictions for the document that are provided to the indexer component 710. In the example in which a portion corresponds to a sentence, there may be a prediction for each sentence in the document regarding what layout type the respective sentence appears in. The index represents a computer-readable index that is structured so as to be interpretable by a computing system to represent a predicted layout type associated with each of the portions of the document.

FIG. 7 illustrates an example of the index in which the index takes the form of a set 720 of portion collections, each portion collection associated with a respective layout type. As an example, there may be a first layout type collection 721 that includes or references portions that are predicted to appear in a first layout type. That first layout type may be identified by a layout type identifier 731 associated with the first layout type collection 721. There may also be a second layout type collection 722 that includes or references portions that are predicted to appear in a second layout type. That second layout type may be identified by a layout type identifier 732 associated with the second layout type collection 722. The ellipsis 723 represents that the index may include any number of layout type collections each associated with a layout type.

As an example, suppose predictions are made for each sentence within a document. The index could include a title layout type collection that indexes all of the sentences predicted to appear within a title, a text layout type collection that indexes all of the sentences predicted to appear within a text layout, a list layout type collection that indexes all of the sentences predicted to appear within a list, a footnote layout type collection that indexes all of the sentences predicted to appear within a footnote, a table layout type collection that indexes all of the sentences predicted to appear within a table, a caption layout type collection that indexes all of the sentences predicted to appear within a caption, a table-of-contents layout type collection that indexes all of the sentences predicted to appear within a table-of-contents, and so forth.

Referring way back to FIG. 1, this description has just completed the description of the prediction phase 120 in which the predictions are generated. The use phase 130 occurs when using the layout predictions. Example uses will now be described.

In one example, a search component is configured to interpret search requests that expressly contain one or more search terms and an expressed identification of a layout type. In response, the search component selects one or more of the layout type collections associated with the layout type by finding the collection with the label identifying that layout type, and performs a search based on the one or more search terms on only the selected one or more collections.

Thus, for instance suppose that the user searches on the term "vaccine" and indicates that the term is to be found only in a title. The search component would search through the index for that title layout type for each document to be searched. Since the search involves navigating only a simplified index for each document, the search can occur much more quickly, as compared to having to search an entire index for each document. Thus, searching efficiency is improve, in addition to permitting searching based on layout.

Figure 8:
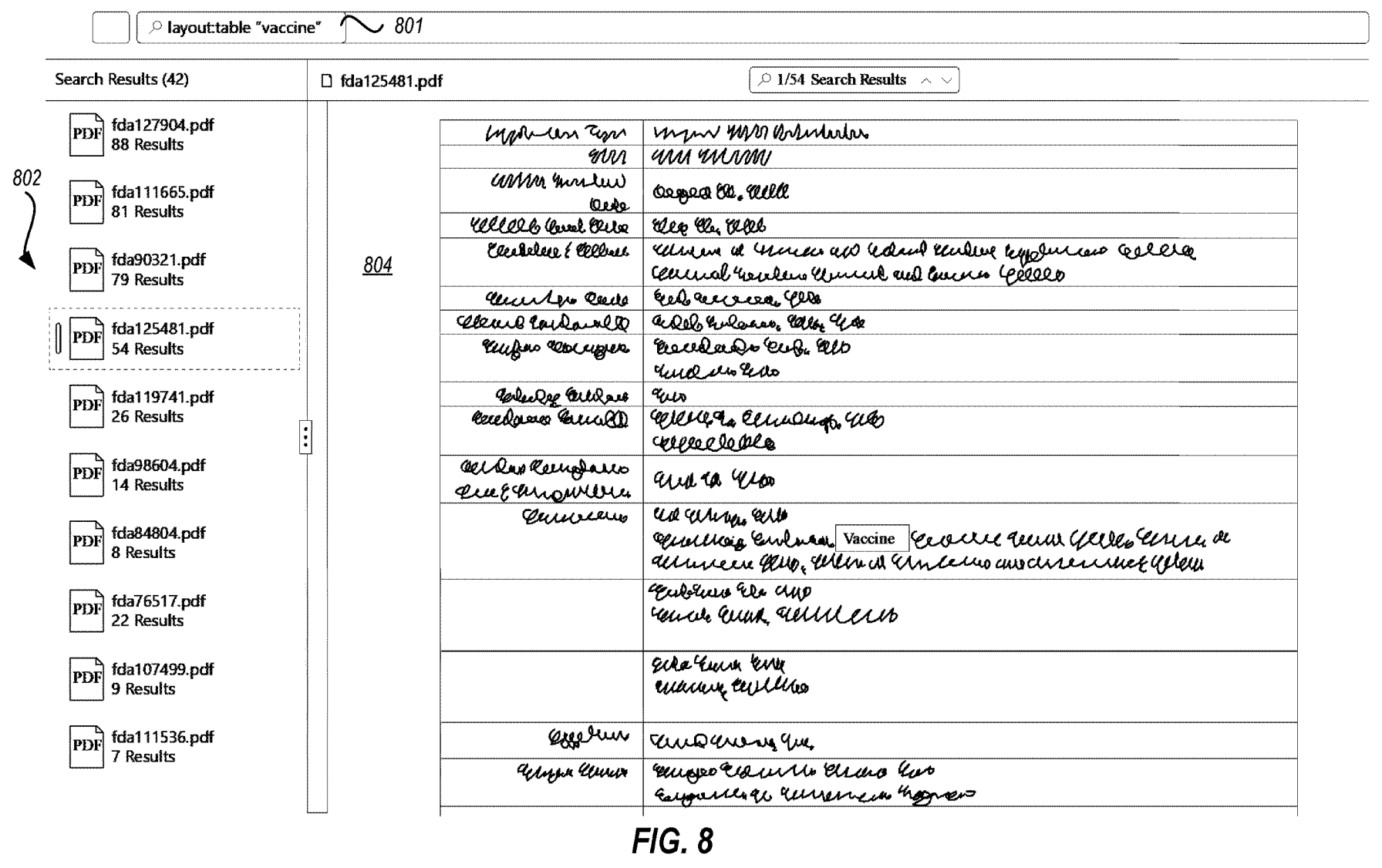

FIGS. 8 through 12 illustrate various examples of performing a search based on search term(s) and layout in accordance with the principles described herein. In FIG. 8, the user entered a query layout:table "vaccine" in the search query field indicating that the user is searching for any documents in which the term "vaccine" appears in a table-type layout. The resulting documents are shown in the search results field 802. Note that these documents are pdf documents, which are typically not tagged within layout information (unlike HTML, documents). If the user selects one of the resulting documents (see dashed box 803), the document is opened in the result detail field 804 where the found term located within the specified layout (table in the case of FIG. 8) is visually emphasized. In this case, for each of the documents to be searched, the searching component might only navigate the index corresponding to the table layout type, simplifying the search and shortening query response times.

Figure 9:
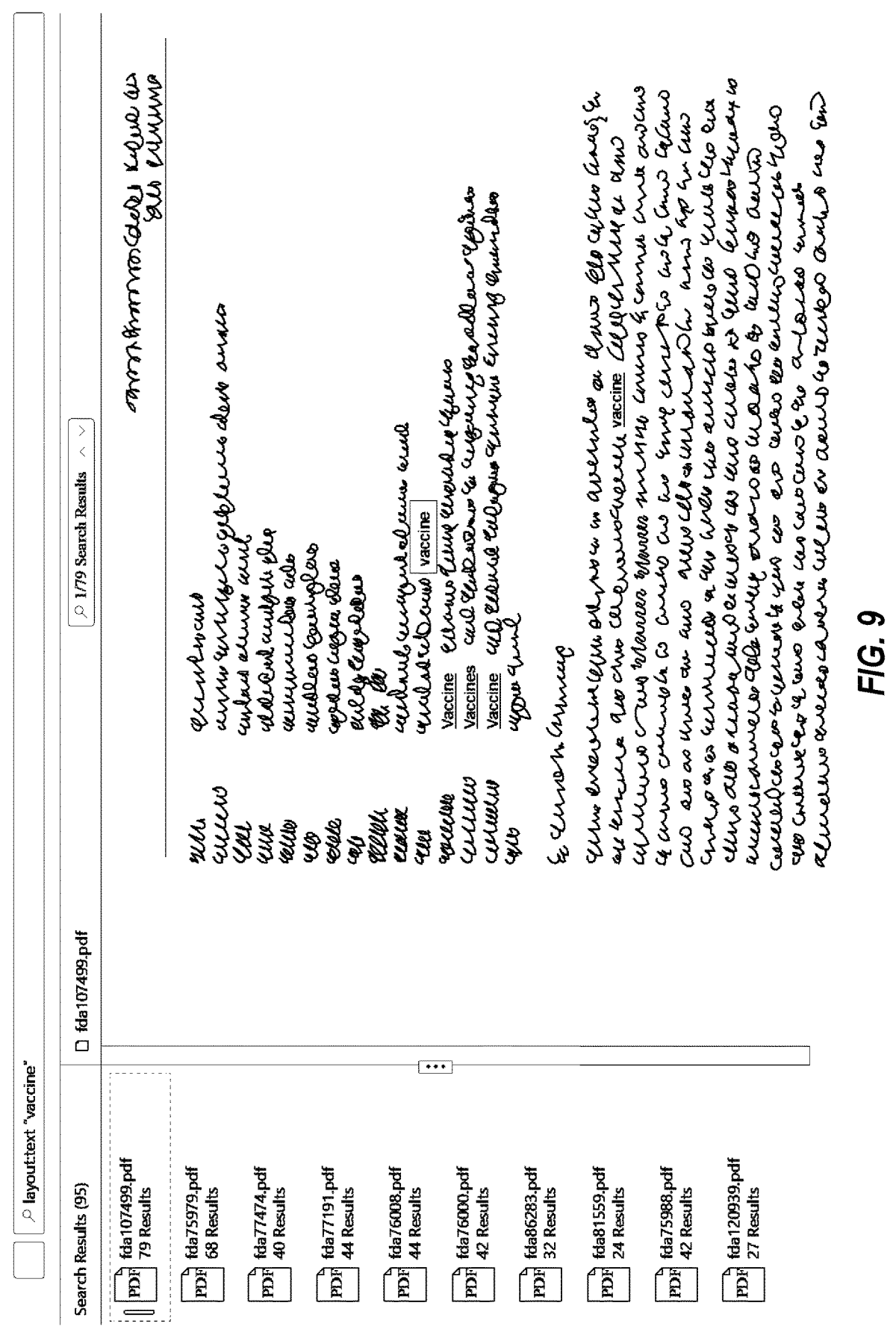
Figure 10:
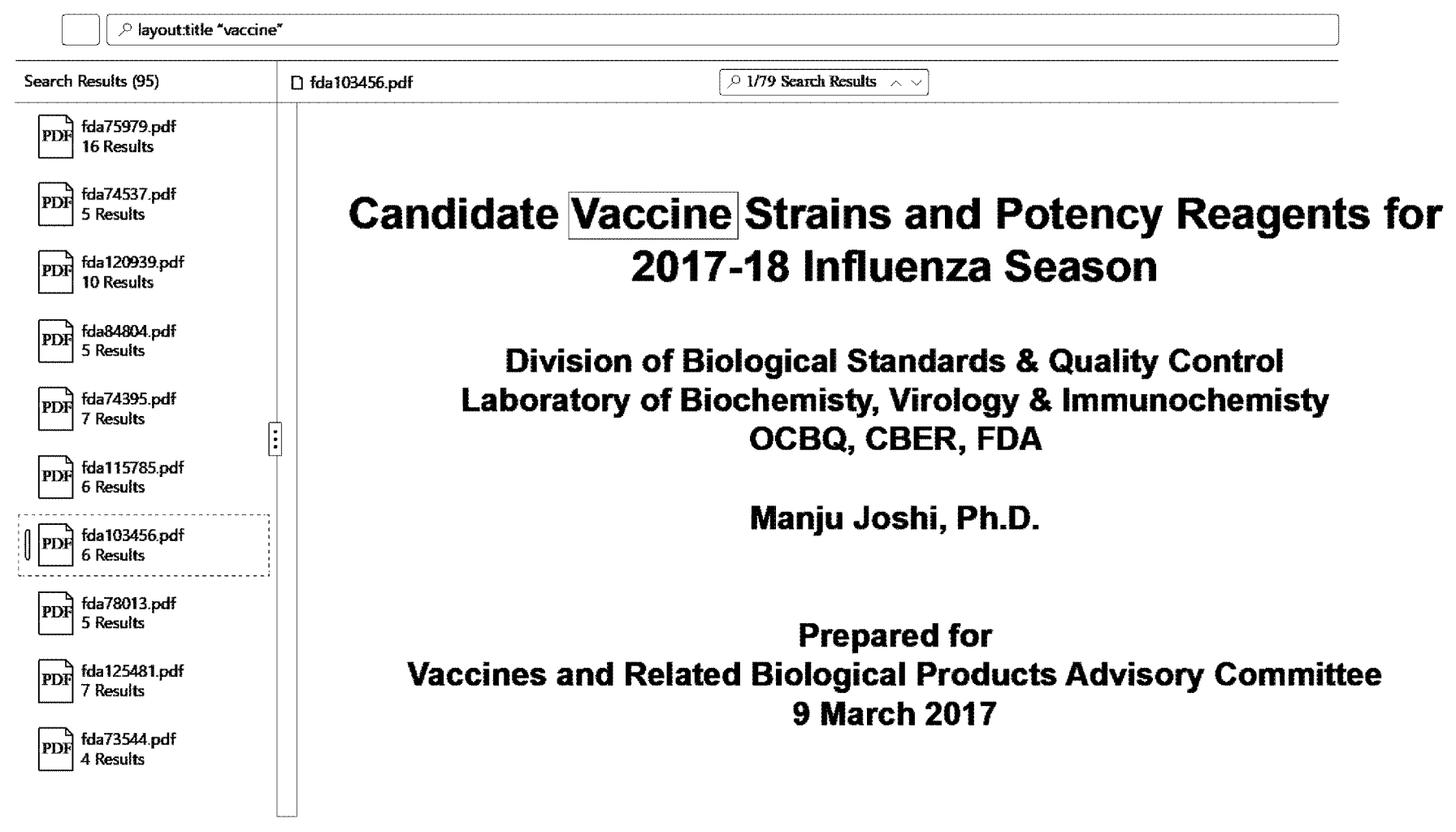
Figure 12:
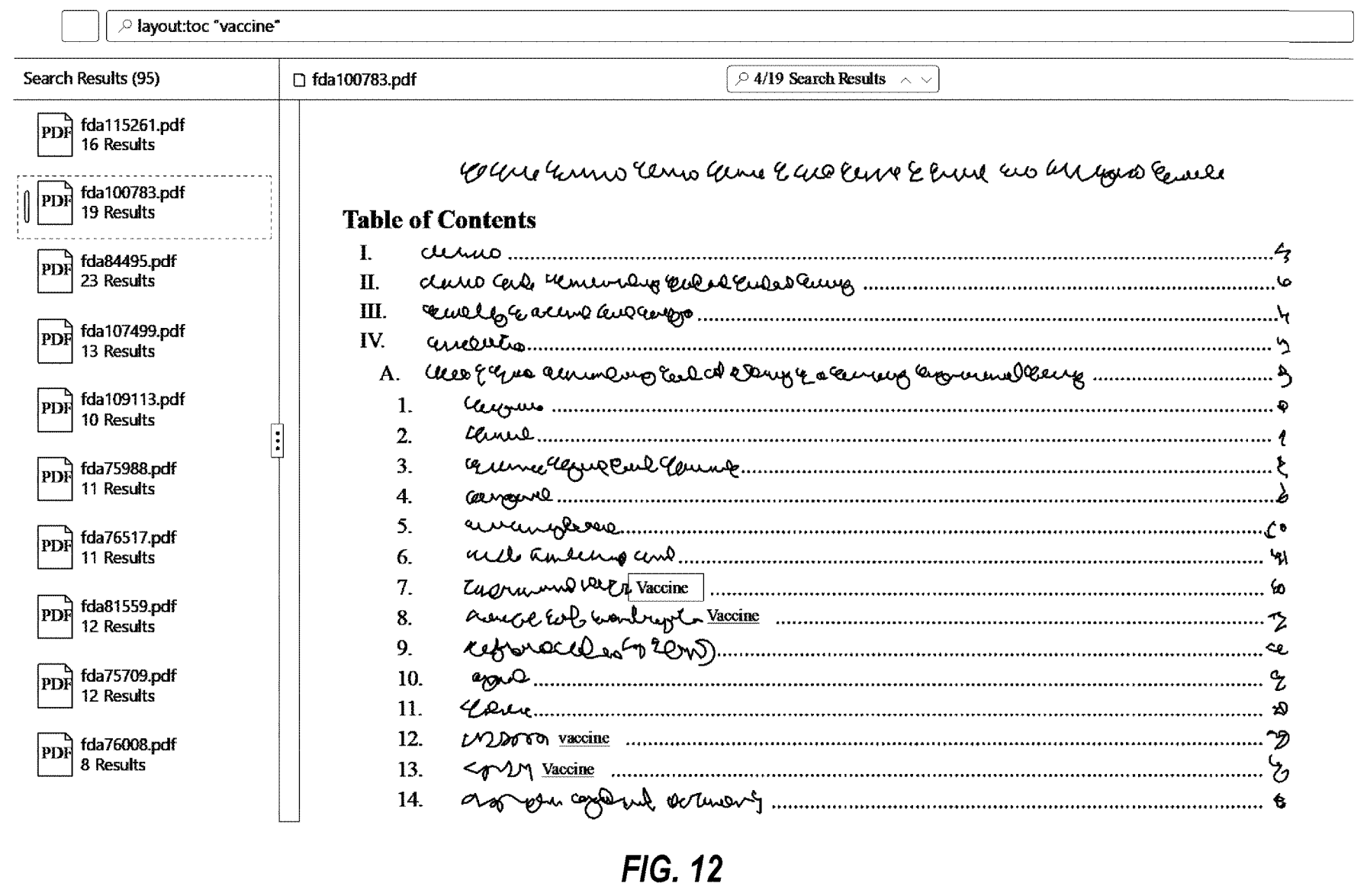

FIG. 9 illustrates a similar user interface except in this case the user has searched for the same term located in a text layout. Note that different documents satisfied the search criteria for the term as found in text. FIG. 10 illustrates the case where the user has searched for documents having the term in a title. FIG. 11 illustrates the case where the user has searched for documents having the term in a list. FIG. 12 illustrates the case where the user has searched for documents having the term in a table-of-contents.

In the case of FIGS. 8 through 12, the user has explicitly identified the layout type in which the search term is being searched for. However, there may be times where a search does not specify a layout type, but only a search term. In this case, the principles described herein permit for some layout types to be ignored. In this case, the search component may determine a layout type that is not to be associated with the search request. The search is then performed only on those layout types that are not determined to be excluded from the search. As an example, perhaps a search automatically excludes a search of footnotes unless otherwise indicated. After all, footnotes are often not the main focus of the document.

In other case, where a search does not specify a layout type, one or more layout types may be selected by default.

In this case, the search component may determine a layout type that is to be associated with the search request (notwithstanding the layout type not being expressly specified in the search query) The search is then performed only on those layout types that are not determined to be included within the search.

As another use case, the user might conduct a search for documents having a similar layout to a document that the user is currently viewing. As an example, the user might be viewing infection rates by state sorted within a table, and ask for similar documents. That might allow the user to more quickly find other tables of infection rates. In yet other embodiments, the collections of indices sorted in layout-specific indices may be used as input to yet other models.

Accordingly, an efficient mechanism to index documents by layout are described. This allows for efficient mechanism to search documents based on search terms and layout. This is possible even if the document being searched does not tag or identify layout (at least not at the level of the prediction being made).

Because the principles described herein are performed in the context of a computing system, some introductory discussion of a computing system will be described with respect to FIG. 13. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 13:
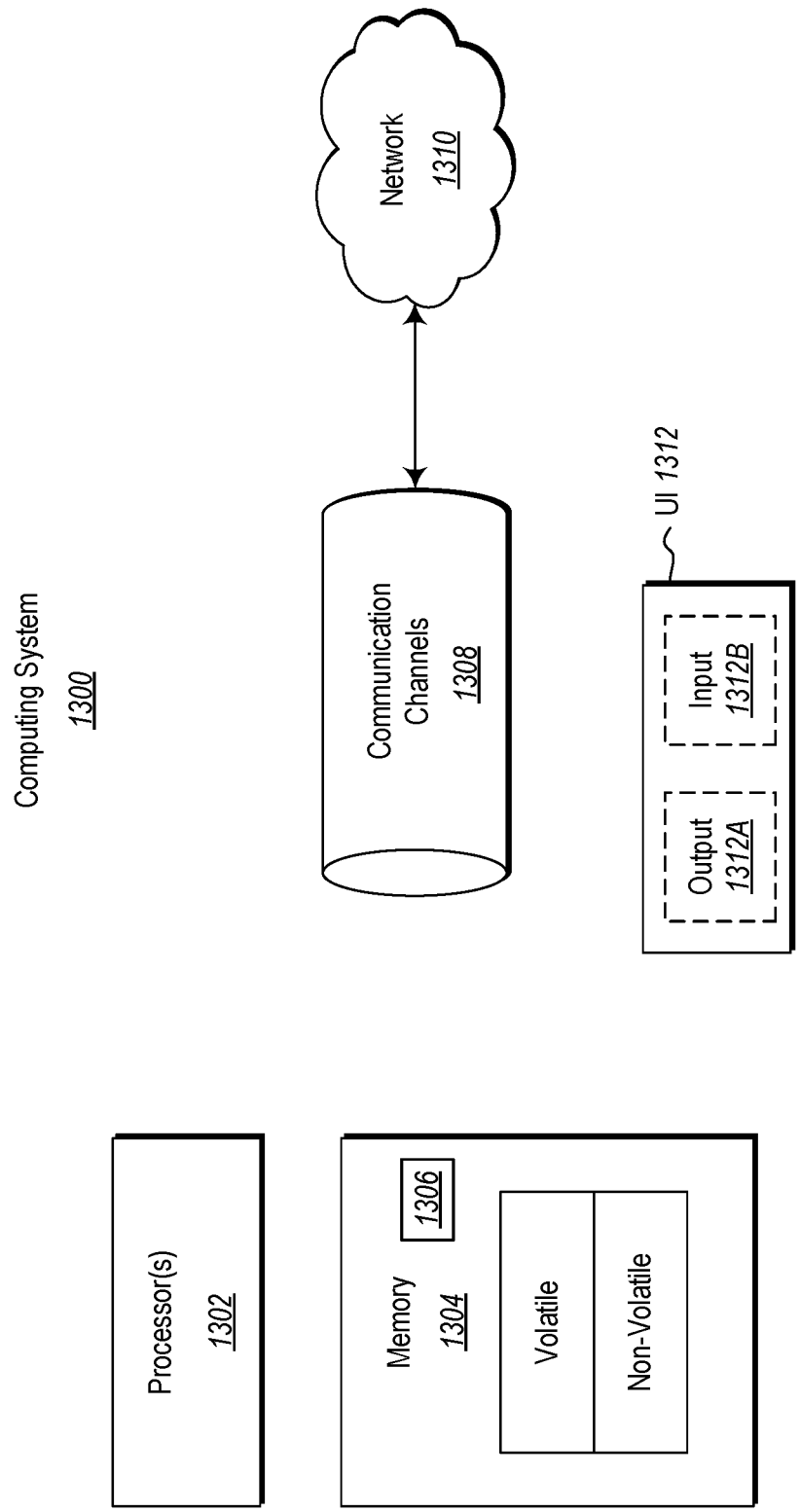
FIG. 13 illustrates an example computing system in which the principles described herein may be employed.

As illustrated in FIG. 13, in its most basic configuration, a computing system 1300 includes at least one hardware processing unit 1302 and memory 1304. The processing unit 1302 includes a general-purpose processor. Although not required, the processing unit 1302 may also include a field programmable gate array (FPGA), an application specific integrated circuit (ASIC), or any other specialized circuit. In one embodiment, the memory 1304 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 1300 also has thereon multiple structures often referred to as an "executable component". For instance, the memory 1304 of the computing system 1300 is illustrated as including executable component 1306. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 1304 of the computing system 1300. Computing system 1300 may also contain communication channels 1308 that allow the computing system 1300 to communicate with other computing systems over, for example, network 1310.

While not all computing systems require a user interface, in some embodiments, the computing system 1300 includes a user interface system 1312 for use in interfacing with a user. The user interface system 1312 may include output mechanisms 1312A as well as input mechanisms 1312B. The principles described herein are not limited to the precise output mechanisms 1312A or input mechanisms 1312B as such will depend on the nature of the device. However, output mechanisms 1312A might include, for instance, speakers, displays, tactile output, virtual or augmented reality, holograms and so forth. Examples of input mechanisms 1312B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors; and
   one or more computer-readable media having stored thereon computer-executable instructions that are structured such that, if executed by the one or more processors, would cause the computing system to perform a machine-learned prediction of a layout type that each of a plurality of portions of a document appears in by performing the following:

accessing a computer-readable representation of a document that contains a plurality of portions and, for at least one portion of the document, a plurality of sub-portions, for which there is no layout information at a granularity of the layout prediction to be made identified within the computer-readable representation of the document;

for each of the plurality of sub-portions, predicting a layout type that the particular sub-portion appears in; and for each of the plurality of the portions, predicting a layout type that each of the plurality of portions appears in, wherein if the particular portion of the plurality of portions contains the particular sub-portions, the predicting the layout type for the particular portion is done by using the layout predictions for the particular sub-portion; and indexing the document using the layout predictions for each of the plurality of portions and each of the plurality of sub-portions so as to result in a computer-readable index that is structured so as to be interpretable by a computing system to represent a predicted layout type associated with each of the plurality of portions and each of the plurality of sub-portions of the document.

2. The computing system in accordance with claim 1, the computer-executable instructions being further structured such that, if executed by the one or more processors, the predictions of the layout type of the sub-portions is performed using a neural network.

3. The computing system in accordance with claim 2, the computer-executable instructions being further structured such that, if executed by the one or more processors, the predictions of the layout type of the particular portions is performed using a rules-based prediction component.

4. The computing system in accordance with claim 1, the particular portion being a sentence.

5. The computing system in accordance with claim 4, the multiple sub-portions of the particular portion being words within the sentence.

6. The computing system in accordance with claim 4, the multiple sub-portions of the particular portion being characters within the sentence.

7. The computing system in accordance with claim 1, the computer-executable instructions being further structured such that, if executed by the one or more processors, the indexing of the document is performed by constructing multiple collections each associated with a respective layout type, and each containing one or more portions of the document that are predicted to appear in the respective layout type.

8. The computing system in accordance with claim 7, the computer-executable instructions being further structured such that, if executed by the one or more processors, the computing system is caused to instantiate a search component that is configured to interpret search requests that expressly contain one or more search terms and an identification of a layout type, and in response:

selecting one or more of the multiple collections associated with the identified layout type; and performing a search based on the one or more search terms, the search being performed on only the selected one or more collections.

9. The computing system in accordance with claim 8, search requests including searches for documents based at least in part upon similarity in layout with an identified document.

10. The computing system in accordance with claim 7, the computer-executable instructions being further structured such that, if executed by the one or more processors, the computing system is caused to instantiate a search component that is configured to interpret search results that contain one or more search terms, but not an identification of a layout type, and in response:

determining a layout type associated with the search request;

selecting one or more of the multiple collections associated with the determined layout type; and performing a search based on the one or more search terms, the search being performed on only the selected one or more collections.

11. The computing system in accordance with claim 7, the computer-executable instructions being further structured such that, if executed by the one or more processors, the computing system is caused to instantiate a search component that is configured to interpret search results that contain one or more search terms, but not an identification of a layout type, and in response:

determining a layout type that is not to be associated with the search request;

selecting one or more of the multiple collections not associated with the determined layout type; and performing a search based on the one or more search terms, the search being performed on only the selected one or more collections.

12. The computing system in accordance with claim 1, the computer-executable instructions being further structured such that, if executed by the one or more processors, the indexing of the document is performed by:

constructing a first collection of portions of the document that are predicted to appear in a first layout type, and labelling the first collection with an identification of the first layout type; and constructing a second collection of portions of the document that are predicted to appear in a second layout type, and labelling the second collection with an identification of the second layout type.

13. A method performed by a computing system, the method for machine-learned prediction of a layout type that each of a plurality of portions of a document appears in, the method comprising:

accessing a computer-readable representation of a document that contains a plurality of portions and, for at least one portion of the document, a plurality of sub-portions, for which there is no layout information at a granularity of the layout prediction to be made identified within the computer-readable representation of the document;

for each of the plurality of sub-portions, predicting a layout type that the particular sub-portion appears in; and for each of the plurality of the portions, predicting a layout type that each of the plurality of portions appears in, wherein if the particular portion of the plurality of portions contains the particular sub-portions, the predicting the layout type for the particular portion is done by using the layout predictions for the particular sub-portion; and indexing the document using the layout predictions for each of the plurality of portions and each of the plurality of sub-portions so as to result in a computer-readable index that is structured so as to be interpretable by a computing system to represent a predicted layout type associated with each of the plurality of portions and each of the plurality of sub-portions of the document.

14. The method in accordance with claim 13, the predictions of the layout type of the sub-portions being performed using a neural network.

15. The method in accordance with claim 14, the predictions of the layout type of the particular portions is performed using a rules-based prediction component.

16. The method in accordance with claim 13, the particular portion being a sentence, the multiple sub-portions of the particular portion being words within the sentence.

17. The method in accordance with claim 13, the indexing of the document is performed by constructing multiple collections each associated with a respective layout type, and each containing one or more portions of the document that are predicted to appear in the respective layout type.

18. A computer program product comprising having stored thereon computer-executable instructions that are structured such that, if executed by one or more processors a computing system, would cause the computing system to perform a machine-learned prediction of a layout type that each of a plurality of portions of a document appears in by performing the following:

accessing a computer-readable representation of a document that contains a plurality of portions and, for at least one portion of the document, a plurality of sub-portions, for which there is no layout information at a granularity of the layout prediction to be made identified within the computer-readable representation of the document;

for each of the plurality of sub-portions, predicting a layout type that the particular sub-portion appears in; and for each of the plurality of the portions, predicting a layout type that each of the plurality of portions appears in, wherein if the particular portion of the plurality of portions contains the particular sub-portions, the predicting the layout type for the particular portion is done by using the layout predictions for the particular sub-portion; and indexing the document using the layout predictions for each of the plurality of portions and each of the plurality of sub-portions so as to result in a computer-readable index that is structured so as to be interpretable by a computing system to represent a predicted layout type associated with each of the plurality of portions and each of the plurality of sub-portions of the document.

19. A computing system comprising:

one or more processors; and one or more computer-readable media having stored thereon computer-executable instructions that are structured such that, if executed by the one or more processors, would cause the computing system to perform a machine-learned prediction of a layout type that each of a plurality of portions of a document appears in by performing the following:

accessing a computer-readable representation of a document that contains a plurality of portions, defined by bounding boxes, for which there is no layout information at a granularity of a layout prediction to be made identified within the computer-readable representation of the document;

for each of the plurality of portions, predicting a layout type that the particular portion appears in; and indexing the document using the layout predictions so as to result in a computer-readable index that is structured so as to be interpretable by a computing system to represent a predicted layout type associated with each of the plurality of portions of the document.

* * * * *